United States Patent [19]

DeVlieger

[11] Patent Number: 4,989,366
[45] Date of Patent: Feb. 5, 1991

[54] TREE INJECTING DEVICE

[76] Inventor: Terry A. DeVlieger, 2006 6th Pl., SW., Largo, Fla. 34640

[21] Appl. No.: 550,865

[22] Filed: Jul. 10, 1990

[51] Int. Cl.$^5$ .......................... A01G 7/06; A11G 29/00
[52] U.S. Cl. ..................................................... 47/57.5
[58] Field of Search .................. 47/57.5, 48.5; 222/82, 222/83, 541

[56] References Cited

U.S. PATENT DOCUMENTS 3,286,401 11/1966 Mauget .............................. 47/57.5

FOREIGN PATENT DOCUMENTS 1451385 9/1966 France .................................. 47/57.5
0621985 3/1981 Switzerland ........................... 222/83

Primary Examiner—David A. Scherbel
Assistant Examiner—Jerrold D. Johnson
Attorney, Agent, or Firm—Herbert W. Larson

[57] ABSTRACT

A tree injecting disposable device having a funnel housing, compression housing and a plunger housing in cooperative engagement with each other. A tube on the end of the funnel housing is used for inserting into a pre-drilled hole in a tree. A systemic pesticide or fertilizer liquid is sealed within the device. As the plunger housing is depressed a spike within the plunger housing breaks a thin membrane in the funnel housing and allows the liquid to move from the inside of the device by plunger pressure and gravity into the tree.

17 Claims, 4 Drawing Sheets

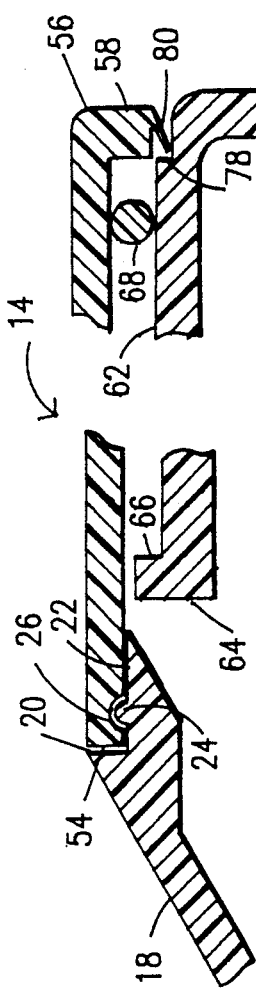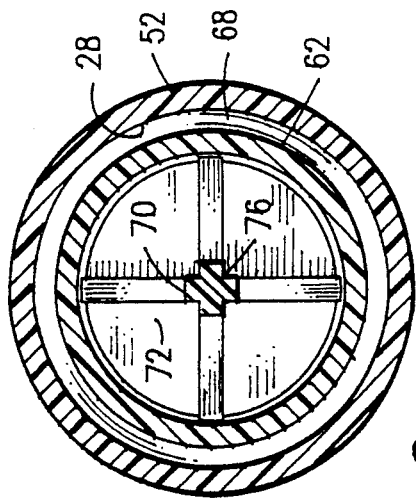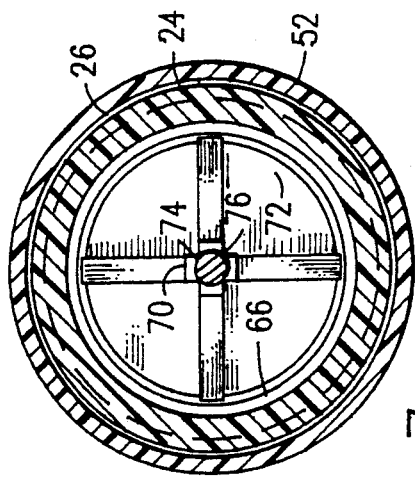

TREE INJECTING DEVICE

BACKGROUND OF THE INVENTION

1. Field of The Invention

This invention relates to tree injecting devices. More particularly, it refers to a plunger type hand held device used to inject liquid chemicals into living cells of a tree.

2. Description of The Prior Art

Large standing trees are continuing to have increased value both from an ornamental and economic viewpoint. Great efforts have been exerted by man to promote the growth of trees and to save trees from infection. This has included various modes of treatment. One common method of delivering liquid fertilizer or systemic pesticide to tree is by injecting the liquid directly into the living cells beneath the cortex layer of the tree trunk. Generally a small horizontal or downwardly inclined hole is drilled in the tree trunk and the liquid is injected from a pressurized container such as described in U. S. Pat. No. 3,130,519. Additional injection methods and devices are shown in U. S. Pat. Nos. 4,011,685 and 4,144,673. In addition, friable containers or ampules are inserted into a hole drilled in a tree trunk. After breaking the ampule, the liquid flows into the living tree cells as shown in U.S. Pat. No. 3,367,065. Although the methods in the patents are useful in achieving their objections, they each have practical limitations. In the case of U. S. Pat. No. 3,130,519, the injection process requires a pressurized container and the release of the undesirable chemicals required to produce the container pressure. U. S. Pat. No. 4,011,685 describes a refillable reservoir and a polished needle. This is an expensive apparatus which can only justify its cost by repeated use. However, refilling of the reservoir with different liquids; ie, pesticide in place of a tree nutrient could lead to unwanted contamination. U. S. Pat. No. 4,144,673 describes a system requiring a plurality of injection holes in a tree. These multiple holes could provide entry of insects or microscopic contamination from bacteria or fungi. The ampule described in U. S. Pat. No. 3,367,065 requires a rather large cut into the tree and could likewise result in contamination.

A device is needed that can facilitate injection of a liquid substance into a tree's living cells without the need for multiple or large holes in the trunk and can be cheap enough to be thrown away after a single use so that future contamination problems are eliminated.

SUMMARY OF THE INVENTION

I have invented an inexpensive hand held disposable tree injection device that can provide treatment of a liquid pesticide or fertilizer directly to the living cells of the tree without undue risk of contamination. My device has three basic plastic parts; namely, a funnel housing, a compression housing and a plunger housing all in cooperative engagement to form a sealed container with the liquid retained inside. A thin plastic membrane in the funnel housing is ruptured by a spike mounted within the plunger housing as the plunger housing is moved downward through the compression housing. The funnel housing has an end tube inserted into a small hole drilled into the living tissue of a tree. After the membrane is ruptured, the fluid moves into the tree by manual force exerted on the plunger, together with gravity flow. When the fluid container is empty, the tube is removed from the tree and the injecting device is thrown away.

BRIEF DESCRIPTION OF THE DRAWINGS

The invention may be best understood by those having ordinary skill in the art by reference to the following detailed description when considered in conjunction with the accompanying drawings in which:

FIG. 5 is a fractured view of a portion of the device showing the connection between the funnel housing and compression housing.

FIG. 6 is a fractured view of a portion of the device showing the interface between the plunger housing and compression housing.

FIG. 7 is a longitudinal cross section along lines 7—7 of FIG. 2.

FIG. 8 ia a longitudinal cross section along lines 8—8 of FIG. 3.

DETAILED DESCRIPTION OF THE INVENTION

Figure 1:
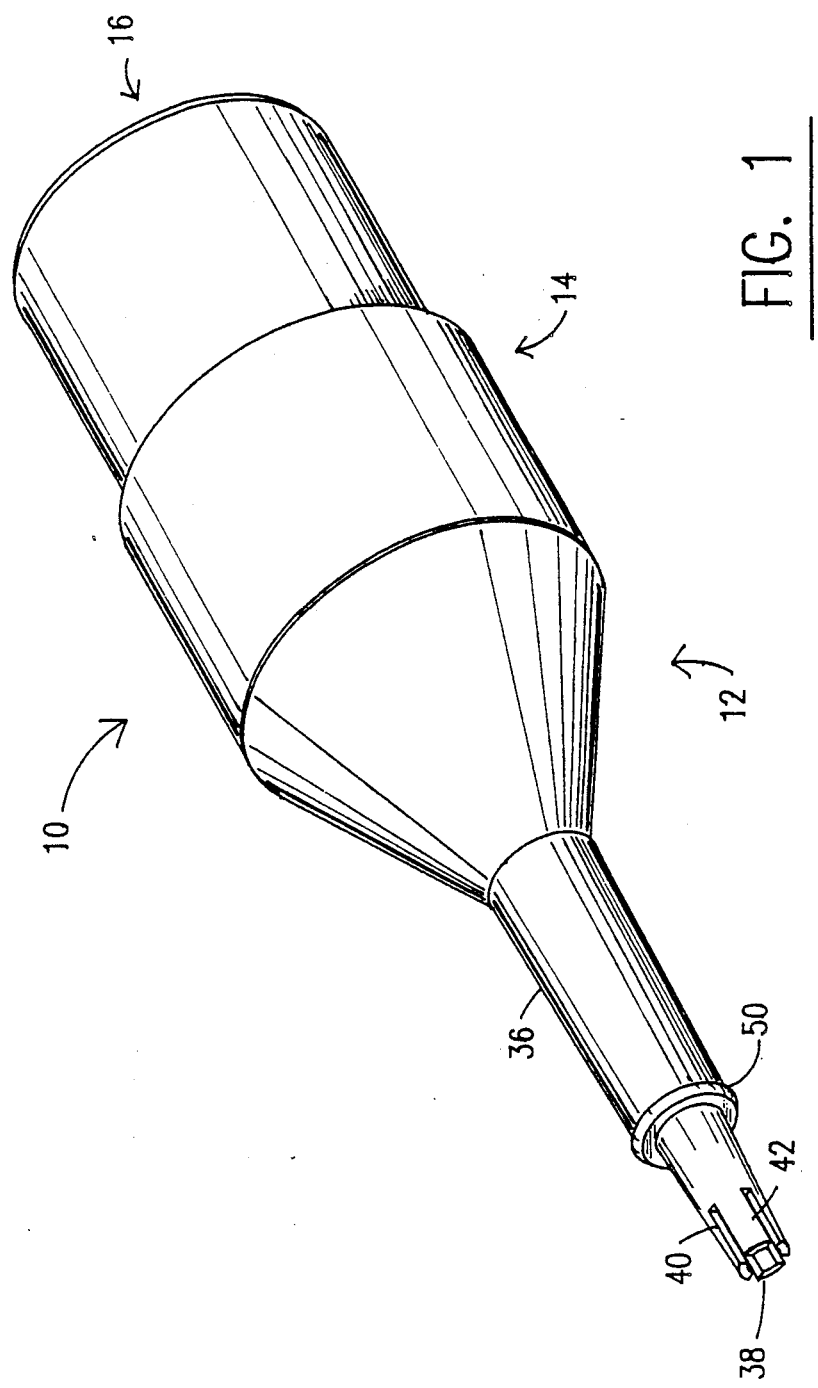
FIG. 1 is a perspective view of the tree injecting device of this invention.

Throughout the following detailed description, the same reference numerals refer to the same elements in all figures.

Figure 4:
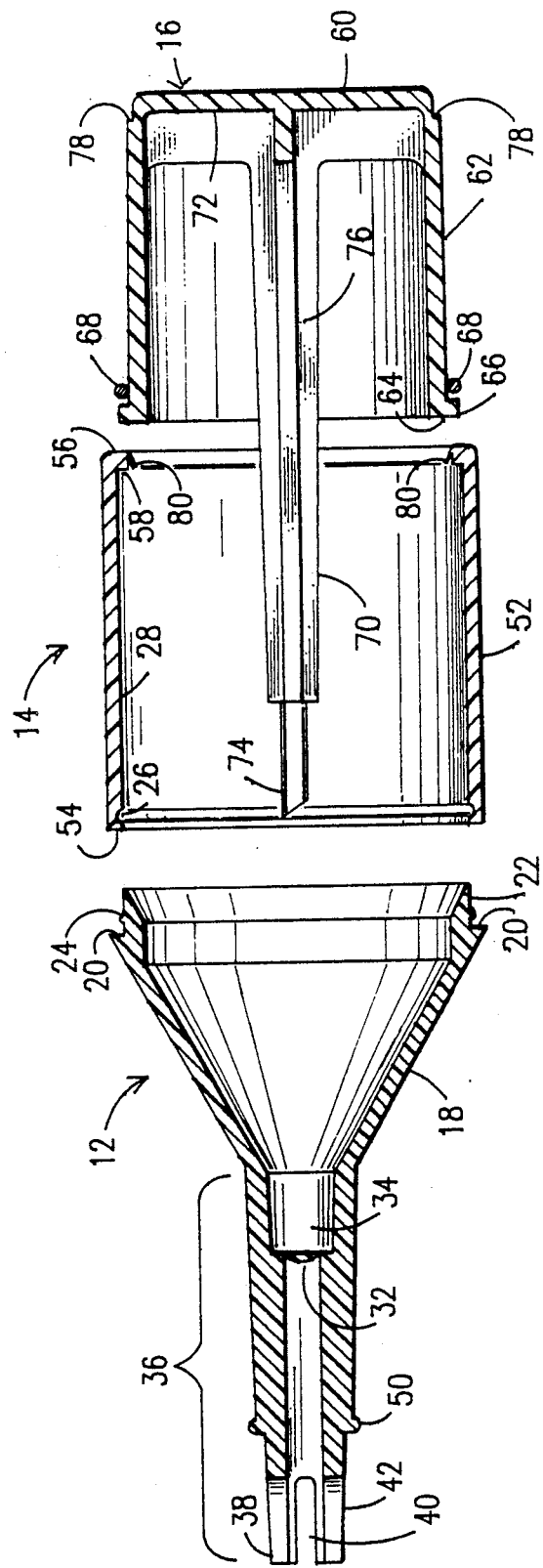
FIG. 4 is an exploded view of the three basic components of the tree injecting device.

The tree injecting device 10 shown in FIG. 1 has three separate basic components shown in FIG. 4. The lower component 12 is the funnel housing. The middle component 14 is the compression housing and the upper component 16 is the plunger housing.

In the funnel housing 12 there is a decreasing tapered portion or funnel portion 18 which has a top edge 20 and an annular flange 22 indented from the edge and projecting upwardly from edge 20. In addition, the flange 22 has an annular latch or boss 24 which snaps into the annular groove 26 located on the inner wall 28 of the compression housing 14. A glue, an epoxy or other sealant is added to the outer surface of flange 22 so that a seal is maintained between the funnel housing housing 12 and the compression housing 14 after a liquid 30 such as a fertilizer or a systemic pesticide fills the space within the compression and plunger housing. Ultra sound can be used alternatively to seal the housings together. The pesticide can be an insecticide, bactericide or a fungicide.

The funnel housing 12 also has a plastic membrane 32 located in a chamber 34 below the funnel 18. This membrane 32 prevents exit of the fluid 30 until the proper time. The funnel housing also has a tapered tube 36 running from the funnel 18 to the end of the funnel housing 38. The tube 36 has multiple slots 40 at the end 38. These slots form fingers 42 that are flexible and can be inserted into the hole 44 through the cortex 46 of the tree. The tube 36 is inserted far enough so that the end portion 38 is located in the live tissue 48 of the tree. An annular stop 50 around the outer periphery of the tube 36 prevents insertion of tube 36 too deeply into the tree hole 44. It is necessary to drill hole 44 at about a 45 degree angle to promote gravity flow of the liquid into the tree. In a typical injection process into a soft wood tree it will take twelve to fourteen hours to inject a typical nutrient liquid dose.

The compression housing 14 has an outer cylindrical wall 52 joining edges 54 and 56 of the compression housing 14. A flange 58 projects inwardly from edge 56 to provide a stop to prevent the plunger housing 16 from being pulled past edge 56.

The plunger housing 16 has a disc shaped upper surface 60, and a cylindrical outer wall 62 joining the disc and bottom edge 64. An outwardly directed flange 66 from edge 64 engages with flange 58 from the compression housing as stated above to prevent the plunger housing 16 from being pulled loose from the compression housing 14 in the open position. See FIG. 2. An O-ring 68 made from an elastomer surrounds the outer wall 62 and prevents leakage of the liquid 30 from the compression and plunger housing. Flange 66 closely abuts the inner wall 28 of the compression housing 14 but the wall 62 of the plunger housing is spaced apart from the inner wall 28 of the compression housing. Shelf 78 on plunger housing 16 is engaged by latch 80 on the compression housing 14 to prevent reuse of the device 10 after the liquid 30 is pushed out of the device. See FIG. 3.

Figures 2, 3:
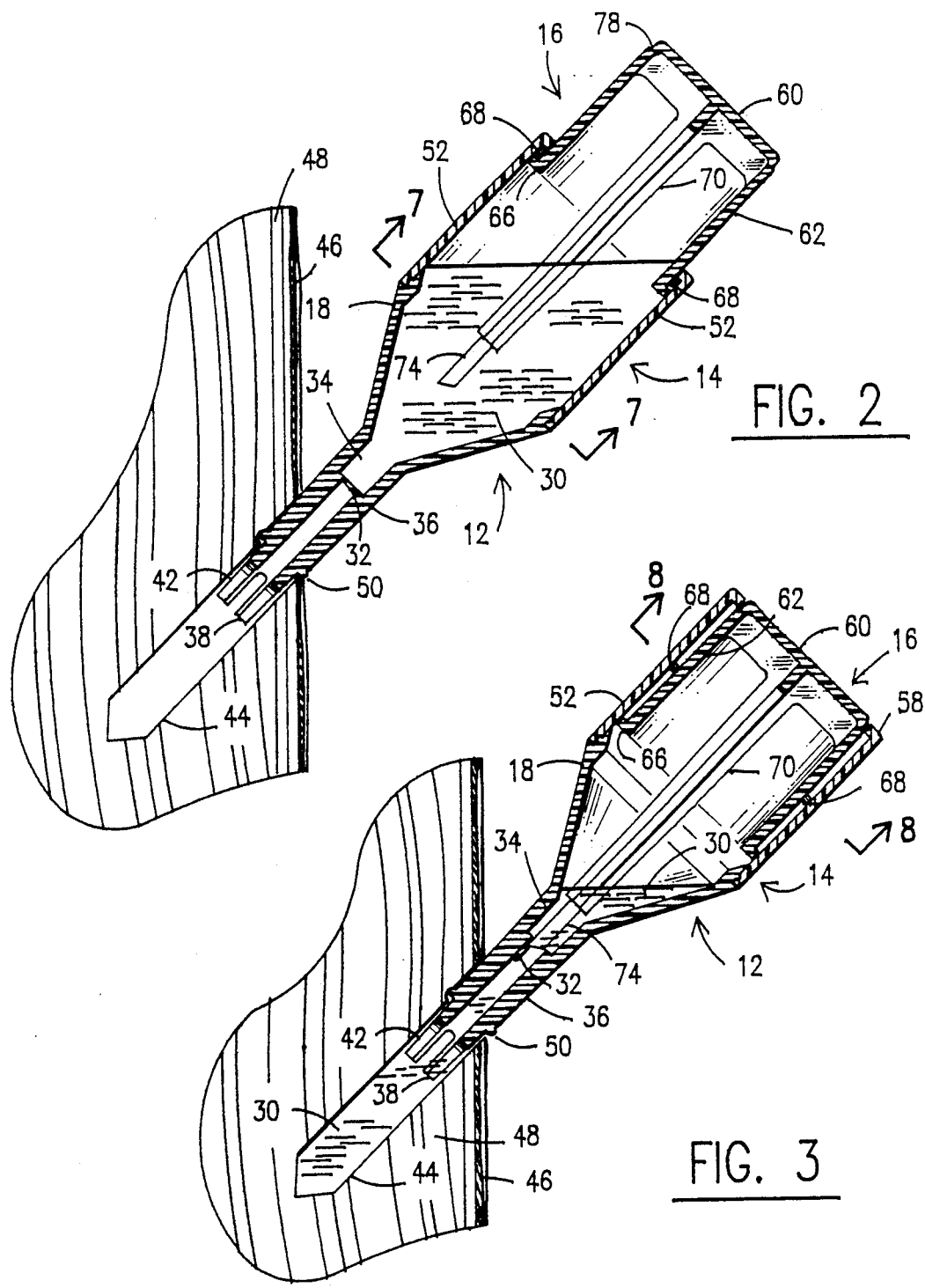
FIG. 2 is a longitudinal cross section of the tree injection device inserted into a drilled hole in a tree and prior to injecting the liquid contents of the device into the tree.
FIG. 3 is a longitudinal cross section of the tree injecting device inserted in a drilled hole in a tree and during injecting of the liquid contents of the device into the tree.

A spike 70 is integral with the inner surface 72 of the disc 60 in the plunger housing 16 and descends downwardly from the disc inner surface 72 towards the funnel housing. In the open position as shown in FIG. 2, the spike with its blade tip 74 is spaced apart from the plastic bead or membrane 32 in the funnel housing. There are multiple grooves 76 located in the shaft which connects the inner surface 72 of disc 60 with the cutting edge 74 of the spike 70. These grooves 76 allow for passage of the liquid 30 down through the funnel after the blade tip 74 has penetrated the membrane 32 as seen in FIG. 3.

In filling the container the compression and plunger housing are attached together and the liquid, whether fertilizer or systemic pesticide, is added to the enclosed space and thereafter, the funnel housing 12 is glued by the flange 22 to the inner surface 28 of the compression housing 14. The container is then in a sealed state and can be stored in that condition for long periods of time within the shelf life of the fluid. When it is desirable to use the liquid, the hole 44 is drilled in the tree, the tube 36 is inserted into the tree and the plunger housing is depressed by finger pressure until the spike 70 breaks the membrane 32. The fluid 30 then begins to flow into the tree and continual pressure on the plunger housing 16 continues to push the fluid 30 into the tree. The rate of liquid absorption bY the tree determines the time required to emptY the container.

Each of the basic three parts of this invention can be injection molded from a high strength plastic such as polyethylene, polypropelene or a co-polymer. The sealant or glue used to adhere the funnel housing 12 to the compression housing 14 can be an epoxy or other high strength sealant. Since the component parts are inexpensive to make, the device is disposed of as soon as the plunger is pushed downwardly to the full extent of its reach. The parts are put together in such a manner so that it is virtually impossible to reuse the parts since it cannot be easily be taken apart. This insures that persons will not cause a tree to be contaminated by inserting liquids into a prior used container.

Slight modifications from the various molded contours of the three basic components can be made with equivalent molded components without deviating from this invention.

Having thus described the invention, what is claimed and desired to be secured by Letters Patent is:

1. A hand held disposable device for injecting liquids directly into the live tissue of a tree comprising
   (a) a lower, middle and upper housing in cooperating engagement to form a sealed container,
   (b) a quantity of liquid within the sealed container,
   (c) the lower housing having a funnel shape with an upper annular integral ring having means for engagement with a lower inner surface of the middle housing, the lower housing having a tapered bottom portion ending in a tube,
   (d) the middle housing having a hollow cylindrical shape, a bottom inner edge having a means for engagement with the upper annular ring of the lower housing, an upper inner edge having inwardly projecting an annular flange to prevent the upper housing from moving out of the middle housing,
   (e) the upper housing having a cylindrical cup shape, a top portion being closed and a bottom portion being open to the interior of the upper housing, a lower edge of the upper housing having an outwardly extending annular flange that abuts an inner wall of the middle housing, an elastomeric ring around an exterior wall of the upper housing to seal a space between the exterior wall of the upper housing and the inner wall of the middle housing to prevent leakage of the liquid out of the container, and a spike descending from an inner surface of the top portion of the upper housing so that when the upper housing is pushed downward, the spike breaks a membrane seal in an inner portion of the lower housing to allow the liquid to flow out of the container into the live tissue of a tree.

2. A device according to claim 1 wherein the liquid in the container is selected from the group consisting of an insecticide, an antibiotic, a fungicide and a tree nutrient.

3. A device according to claim 1 wherein the means on the lower housing for engagement with a lower inner surface of the middle housing is an outwardly protruding latch integral with the annular ring and the middle housing means for engaging with the annular ring of the lower housing is a notch for receiving the lower housing latch.

4. A device according to claim 1 wherein the lower and middle housing are glued together along an outer surface of the lower housing annular ring and the bottom inner edge of the middle housing.

5. A device according to claim 1 wherein the tube of the lower housing has multiple longitudinal cuts in an end portion to form spring action fingers for insertion into a hole drilled in a tree.

6. A device according to claim 5 wherein a stop is located intermediate the end of the tube of the lower housing and its juncture with the funnel, to prevent the tube from being inserted too deeply into the tree.

7. A device according to claim 1 wherein the spike in the upper housing is a downwardly tapered rod having multiple longitudinal flanges, the spike ending in a cutting element which penetrates the membrane seal of the lower housing, the cutting element having a diameter smaller than the inner diameter of the tube in the lower housing.

8. A device according to claim 1 wherein the container is made from a high strength plastic polymer.

9. A hand held disposable device for injecting liquids directly into the live tissue of a tree comprising
 (a) a funnel housing, a compression housing and a plunger housing in cooperating engagement to form a sealed container,
 (b) a quantity of liquid within the sealed container,
 (c) the funnel housing having an upper funnel portion and a lower tube portion, the funnel portion having an annular recessed upwardly projecting flange integral with a top annular edge of the funnel, the flange having a boss on an outer surface,
 (d) the compression housing having a top annular edge and a bottom annular edge, an inner surface of the bottom edge having an annular indentation for receiving the boss from the funnel housing, the top annular edge having an inwardly projecting flange, the top edge and bottom edge being joined by a cylindrical wall enclosing a hollow cavity,
 (e) the plunger housing having a disc shaped upper wall joined to a bottom annular edge of the housing, having an outwardly projecting flange, by a cylindrical wall enclosing a hollow cavity, a spike descending from an inner surface of the upper wall and projecting below the bottom annular edge to engage and a break a thin membrane seal located in the tube portion of the funnel housing upon pressing the upper wall downward towards the bottom edge of the compression housing, and a means to seal the three housings together to prevent leakage of the liquid out of the housing prior to rupturing of the membrane seal.

10. A device according to claim 9 wherein the three housings are made from a high strength plastic polymer.

11. A device according to claim 10 wherein the polymer is translucent.

12. A device according to claim 9 wherein the plunger housing is located within the compression housing cavity, an inner wall of the compression housing cylindrical wall being spaced apart from an outer surface of the plunger housing cylindrical wall, the flange of the plunger housing abutting the inner wall of the compression housing.

13. A device according to claim 9 wherein the means to seal the funnel housing to the compression housing is a sealant around the outer surface of the funnel housing upwardly projecting flange and the means for sealing the compression housing to the plunger housing is an annular elastomeric ring around the outer cylindrical wall of the plunger housing.

14. A device according to claim .13 wherein the elastomeric ring is an O-ring.

15. A device according to claim 13 wherein the sealant joining the funnel housing to the compression housing is an epoxy.

16. A device according to claim 13 wherein an ultra sound beam is the sealant joining the funnel housing to the compression housisng.

17. A device according to claim 9 wherein the liquid within the sealed container is selected from the group consisting of an insecticide, an antibiotic, a fungicide and a tree nutrient.

* * * * *